(12) United States Patent
Krizan et al.

(10) Patent No.: US 7,077,027 B2
(45) Date of Patent: *Jul. 18, 2006

(54) COMPOSITE STEERING COLUMN HOUSING

(75) Inventors: Joseph A. Krizan, Sturgis, MI (US); Ryan E. Greenamyer, Coldwater, MI (US); Chris J. Koleszar, Battle Creek, MI (US)

(73) Assignee: Douglas Autotech Corp., Bronson, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 10/288,088

(22) Filed: Nov. 5, 2002

(65) Prior Publication Data

US 2004/0083844 A1    May 6, 2004

Related U.S. Application Data

(60) Provisional application No. 60/345,053, filed on Nov. 9, 2001.

(51) Int. Cl.
*B62D 1/11* (2006.01)
*B62D 1/16* (2006.01)
*B62D 1/18* (2006.01)

(52) U.S. Cl. .................. 74/493; 74/495; 280/775; 280/777

(58) Field of Classification Search ............. 74/492, 74/493, 495; 280/775, 777
See application file for complete search history.

(56) References Cited

U.S. PATENT DOCUMENTS

| 4,009,622 | A |   | 3/1977 | Hinderks |
| 4,900,059 | A | * | 2/1990 | Kinoshita et al. ............ 280/775 |
| 5,035,446 | A | * | 7/1991 | Arvidsson .................... 280/775 |
| 5,178,411 | A | * | 1/1993 | Fevre et al. ................. 280/775 |
| 5,346,255 | A | * | 9/1994 | Schafer et al. .............. 280/775 |
| 5,520,416 | A | * | 5/1996 | Singer et al. ............... 280/775 |
| 6,116,647 | A | * | 9/2000 | Fischer et al. .............. 280/777 |
| 6,237,956 | B1 |   | 5/2001 | Haba et al. |
| 6,244,128 | B1 |   | 6/2001 | Spencer et al. |

* cited by examiner

*Primary Examiner*—Richard Ridley
*Assistant Examiner*—Colby Hansen
(74) *Attorney, Agent, or Firm*—Kane & Co., PLC

(57) ABSTRACT

A polymeric steering column housing assembly is provided formed from a plurality of components interconnected together using conventional fastening methods for housing a tilting and/or telescoping steering column shaft assembly. In one form of the invention, the steering column housing assembly includes a lower housing member formed from at least two mating parts. Pivotally coupled to the lower housing assembly is an upper steering column assembly likewise formed from at least two mating parts interconnected together. The upper and lower housing members are in turn interconnected by a positioning locking system to control the tilt position of the upper housing member relative to the lower housing member.

7 Claims, 5 Drawing Sheets

COMPOSITE STEERING COLUMN HOUSING

CROSS-REFERENCE TO RELATED APPLICATIONS

This application claims priority from United States Provisional Patent Application filed Nov. 9, 2001 and assigned application Ser. No. 60/345,053, the contents of which are incorporated herein by reference.

BACKGROUND OF THE INVENTION

1. Field of the Invention

This invention relates generally to steering columns, and in particular to a steering column housing which is easy to manufacture and assemble, is light weight, and is less costly to manufacture than prior designs.

2. Brief Description of the Related Art

Traditionally, vehicle steering columns were formed from heavy gauge metal tubular housings fixed to the firewall and dashboard of the vehicle. Articulated and telescoping steering columns became more massive as a direct result of additional metal tubing, universal joints, and more parts. By their very nature, these structures were designed to be rigid so the operator maintained positive operational control of the vehicle at all times. Today steering columns are made substantially the same way with complex structures and rigid heavy metal materials, resulting in too much additional weight and unforgiving structures in collisions.

SUMMARY OF THE INVENTION

It is an object of this invention to provide a tilting and/or telescoping steering column for a vehicle having a substantially fewer parts and hence lower mass than prior designs. It is another object of the instant invention to provide a steering column housing formed from multiple components which are substantially less expensive to manufacture than the previous metal tubular housings. It is yet another object of the instant invention to provide a steering column housing assembly which is easier to manufacture and no longer requires the conventional hydraulic pressing of bearings into rigid tubular housings to journal the steering column shaft(s).

BRIEF DESCRIPTION OF THE DRAWING FIGURES

DETAILED DESCRIPTION OF THE INVENTION

Figure 1:
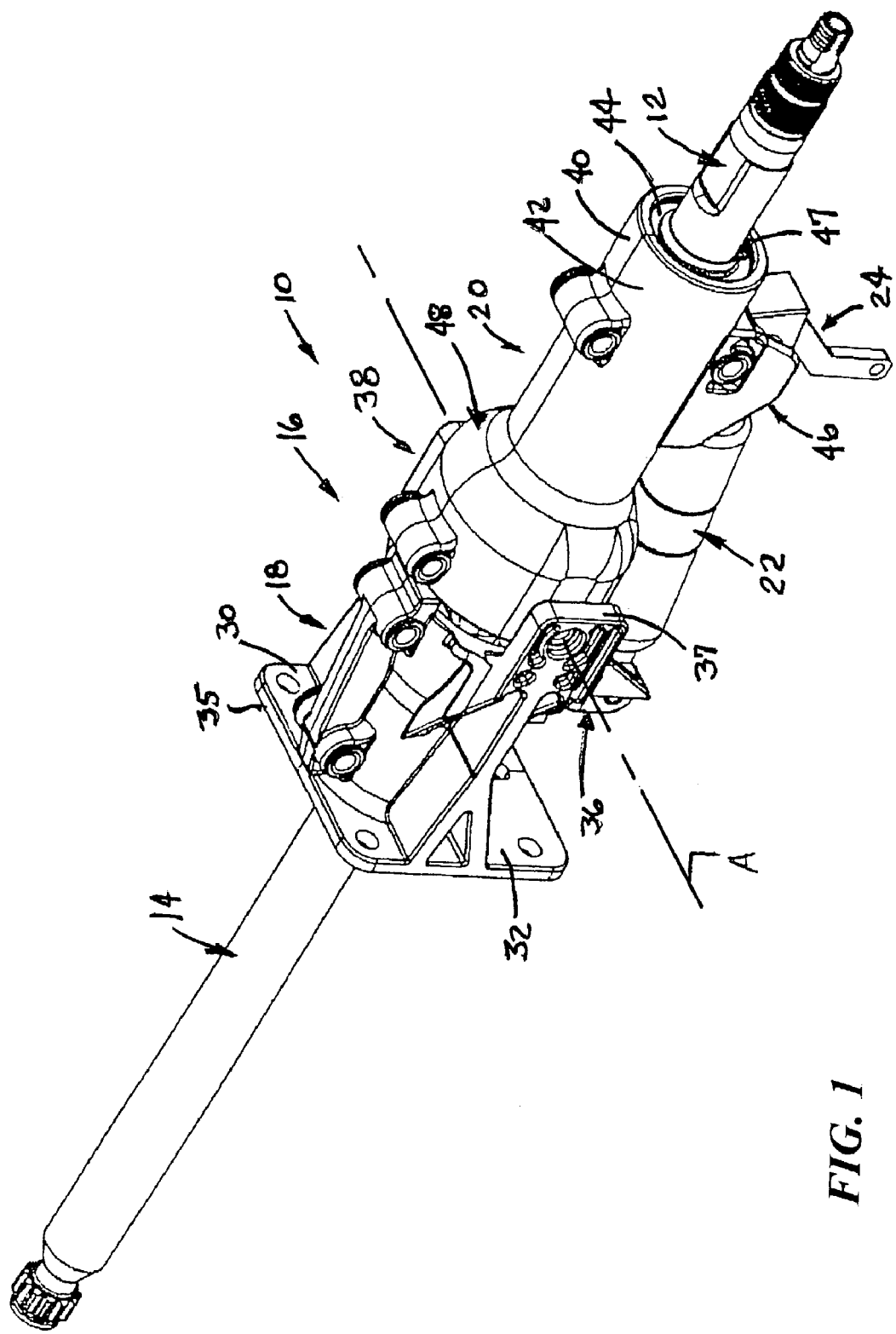
FIG. 1 is an oblique view of one embodiment of a composite steering column assembly embodying the instant invention.

For purposes of the following description, the terms "upper," "lower," "left," "rear," "front," "vertical," "horizontal" and derivatives of such terms shall relate to the invention as oriented in FIG. 1. However, it is to be understood the invention may assume various alternative orientations, except where expressly specified to the contrary. It is also to be understood the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered as limiting, unless the claims expressly state otherwise.

Generally, a steering column housing assembly is provided formed from a plurality of components interconnected together using conventional fastening methods for housing a tilting and/or telescoping steering column shaft assembly. In one form of the invention, the steering column housing assembly includes a lower housing member formed from two halves interconnected together. Pivotally coupled to the lower housing assembly is an upper steering column assembly likewise formed from halves interconnected together. The upper and lower housing members are in turn interconnected by a positioning locking system to control the tilt position of the upper housing assembly to the lower housing assembly.

According to one form of the invention, a steering column assembly is provided comprising a lower steering column housing formed from at least a first and a second mating member adapted to be interconnected together to form a longitudinal passage between an upper and a lower end, the longitudinal passage having at least one bearing seat formed therein. An upper steering column housing is formed from at least a first and a second mating member adapted to be interconnected to form another longitudinal passage between an upper and a lower end, the lower end of the longitudinal passage within the upper steering column housing having an inside diameter greater than the inside diameter of the upper end with the longitudinal passage and having at least one bearing seat formed therein. The lower end of said upper steering column housing is pivotally coupled to the upper end of the lower steering column housing such that the upper steering column housing pivots between a first and a second position relative to the lower steering column housing. The relative position of the upper steering column housing is maintained by a positioning device interconnecting the upper steering column housing with the lower steering column housing. The steering column assembly defined above further includes bearing members which are retained within the bearing seats formed within each of the lower and upper steering column housings. A lower and an upper steering column shafts are journaled within respective ones of the lower and upper steering column housings by the bearing member, and interconnected to each other by a universal joint. The first and second mating members of each of the lower and upper steering column housing members are preferably formed from a moldable or castable material, and most preferably a polymeric material. In a preferred embodiment, the first and second mating members of the lower and upper steering column housing members are injection molded using the polymeric material although other materials such as magnesium and other light weight casting materials may also be used. Additionally, The positioning device may be selected from the group of devices including pneumatic, hydraulic, tooth and pawl, and magneto-rheological locking members.

A method for manufacturing the steering column assembly defined above from a polymeric material, includes the steps of molding or casting a lower and an upper steering column housing from the moldable or casting material, and journaling a lower and an upper steering column shaft and fixing the lower and upper steering column shafts within a respective one of the lower and upper steering column housings. More particularly, the method further comprises the steps of pivotally interconnecting the upper and lower steering column housings and the upper and lower steering column shafts together such that the upper steering column housing is permitted to pivot about a predetermined axis relative to the lower steering column housing. The method further contemplates the step of molding each of the lower and upper steering column housings in at least two portions which are adapted to be interconnected together. It is preferred the lower and upper steering column housings are injection molded from the polymeric material. The step of fixing the lower and upper steering column shafts within respective ones of the lower and upper steering column housings includes positioning the lower and upper steering column shafts within at least one of the at least two portions prior to being interconnected. Furthermore bearing seats are formed within each of the at least two portions of the lower and upper steering column housings for receiving a respective bearing member therein during the assembly. Attachment bosses are also molded during the molding process such that each of the at least two members of the upper and lower steering column housings can be interconnected by fasteners. The method further comprises the step of pivotally coupling the upper and lower steering column housing together with at least one of the upper and lower steering column housing having at least one ball coupler, and the other of the upper and lower steering column housings having at least one socket for receiving the at least one ball coupler. Lastly, the method includes interconnecting the lower and upper steering column housings together with a positioning device, the positioning device including one of a pneumatic cylinder, a hydraulic cylinder, a tooth and pawl locking mechanism, and a magneto-rheological locking mechanism.

According to another form of the invention, a tiltable, polymeric steering-column housing for a motor vehicle is provided, comprising a lower member formed from at least two mold or cast pieces and configured to mate with each other to define a longitudinal passage interconnecting an upper end to a lower end of the lower member. The longitudinal passage of the lower member includes at least one bearing or bushing seat formed therein. An upper member is formed from at least two mold or cast pieces and configured to mate with each other to define another longitudinal passage interconnecting an upper end to a lower end of the upper member. Like in the lower member, the longitudinal passage of the upper member includes at least one bearing or bushing seat formed therein. The lower end of the upper member is pivotally interconnected to the upper end of the lower member such that the upper member pivots between a first and a second position relative to the lower member. A journal bearing or bushing is disposed within each of the seats formed in each of the lower and upper members. A lower and an upper steering column shaft are disposed within respective ones of the longitudinal passages defined in each of the lower and upper members, and journaled within each longitudinal passage. A universal coupler or joint interconnects the lower and upper steering column shafts to substantially complete the column assembly.

Figure 3:
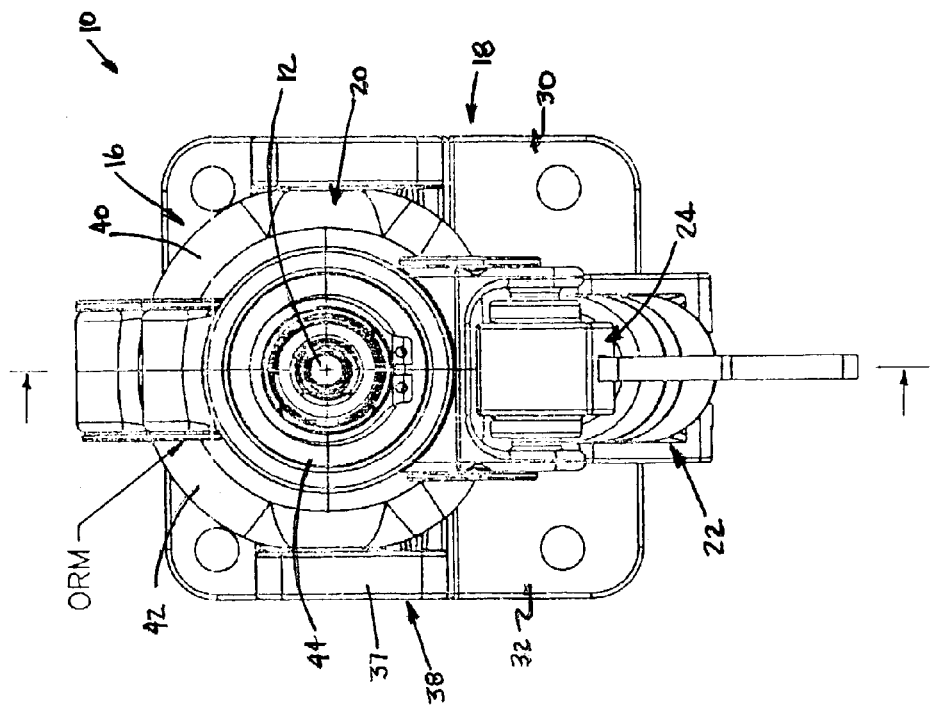
FIG. 3 is an elevation right view of the assembly shown in FIG. 1.
Figure 2:
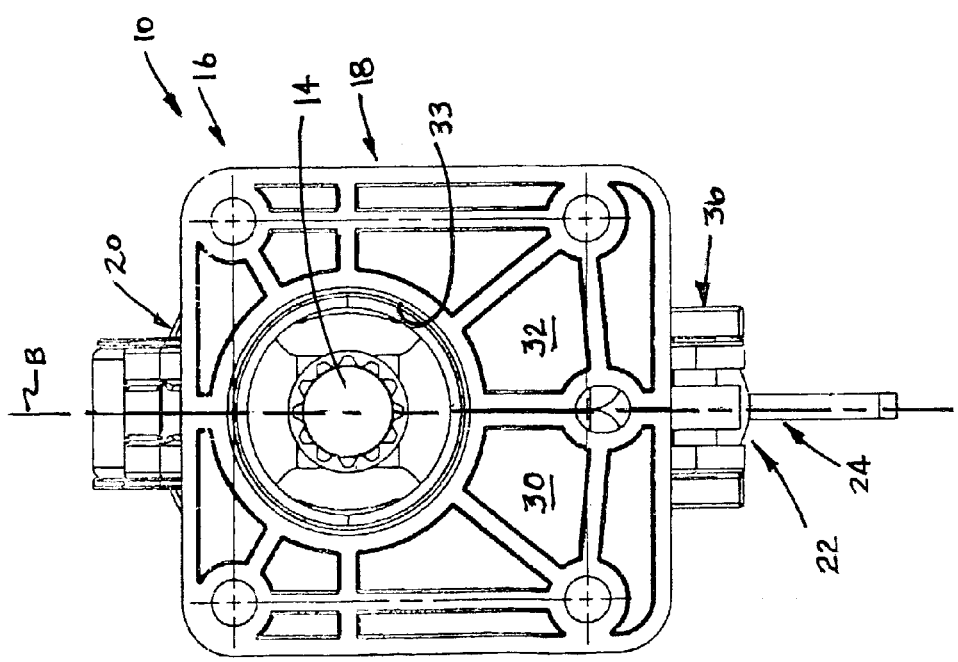
FIG. 2 is an elevation left view of the assembly shown in FIG. 1.

Refer to FIGS. 1–3 which generally illustrate the basic components of the steering column assembly 10 as viewed from the exterior. Essentially, but not limited there to, steering column assembly 10 includes an upper steering column shaft 12 interconnected to a lower steering column shaft 14 by a universal joint (not shown) with both shafts 12 and 14 journaled within a housing assembly 16. In general practice, the free end of the upper steering column shaft 12 is configured to receive a steering wheel (not shown) while the free end of lower steering column shaft 14 is interconnected to another shaft or steering gear box in a well known and conventional manner. The steering column assembly 10 in this embodiment is held in position by fasteners extending through coupling points in the lower end of the housing assembly 16. In addition, steering column assembly 10 may be attached to a frame work or structure of the instrument panel assembly in such a manner so as to stabilize the upper portions of the lower steering column housing in position.

The steering column assembly 10 includes a lower housing assembly 18 having a lower end configured to be fixed to the vehicle and an upper and an opposite end which is adapted to be coupled along Axis A to an upper housing assembly 20. The connection between the upper and lower housing assemblies 18, 20, respectively, is such that the upper housing assembly 20 pivots about a line defined by Axis A relative to the lower housing assembly 18. Pivotal movement of the upper housing assembly 20 relative to the lower housing assembly 18 is controlled in substantial part by a position locking mechanism 22 interconnected at opposite ends to the lower housing assembly 18 and the upper housing assembly 20. A release mechanism 24 disposed at an upper end of the position locking mechanism 22 is manipulated by the operator to engage and disengage the locking mechanism to permit pivotal movement of the upper housing assembly 20 relative to the lower housing assembly 18.

Although the embodiment illustrated in FIGS. 1–3 is that of a tilt steering column assembly 10, the instant invention is equally applicable to steering column assemblies which are fixed or have a telescoping characteristic, as well as telescoping and tilting characteristics. For example, the reader is referred to corresponding U.S. Pat. No. 5,899,497 for an example of a steering column having a particular ball and socket coupling to make the pivotal connection and to U.S. Pat. No. 5,267,480 for an example of a telescoping steering column shaft assembly. Moreover, locking mechanism 22 may include any one of a variety of mechanisms, including, but not limited to, hydraulic cylinder systems, air cylinder systems, magneto-rheologic locking systems, as well as the more conventional tooth and pawl locking engagement members. However, in a preferred embodiment, gas and magneto-rheologic locking devices have been found to produce the most versatility in tilt/telescope positioning.

Figure 4:
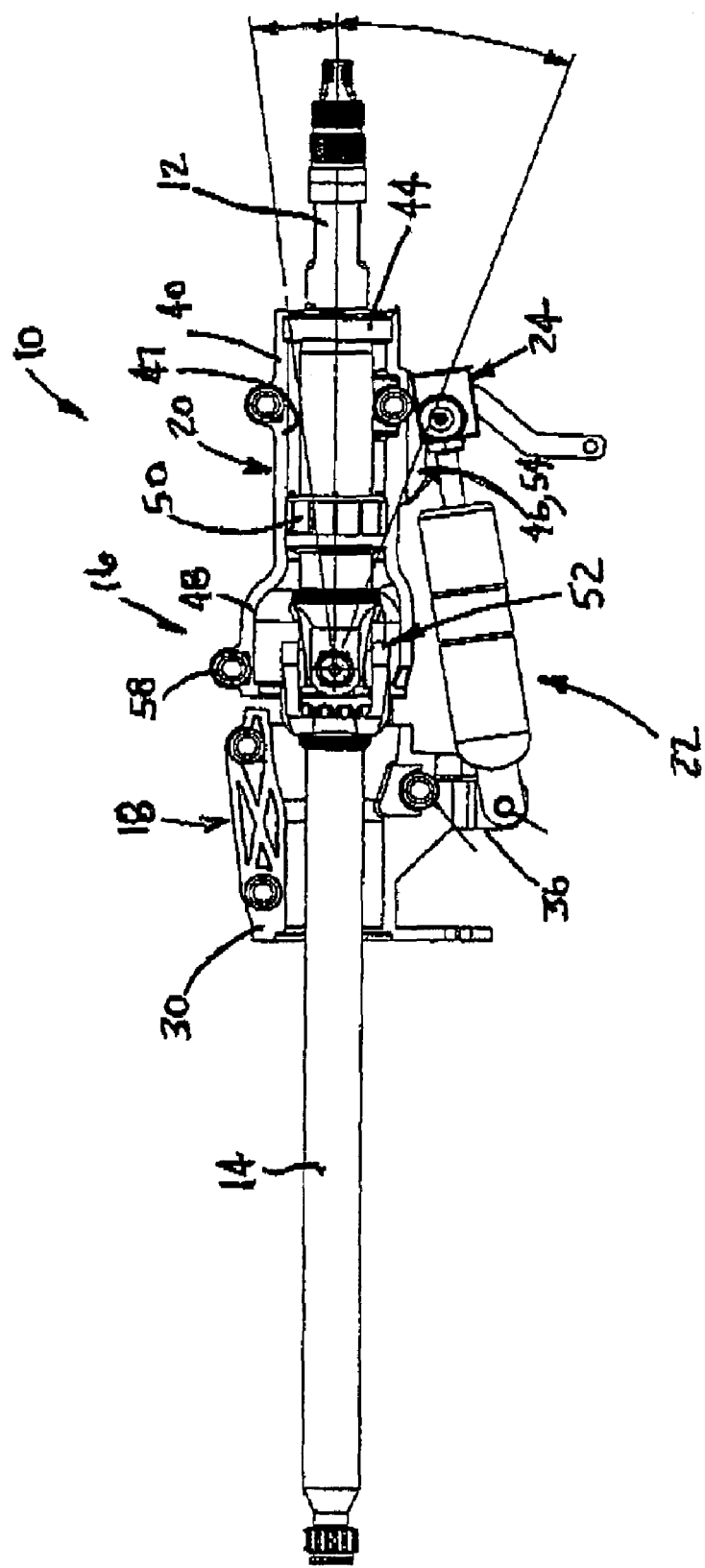
FIG. 4 is a partial section view of the assembly shown in FIG. 3 taken along line IV—IV.
Figure 5:
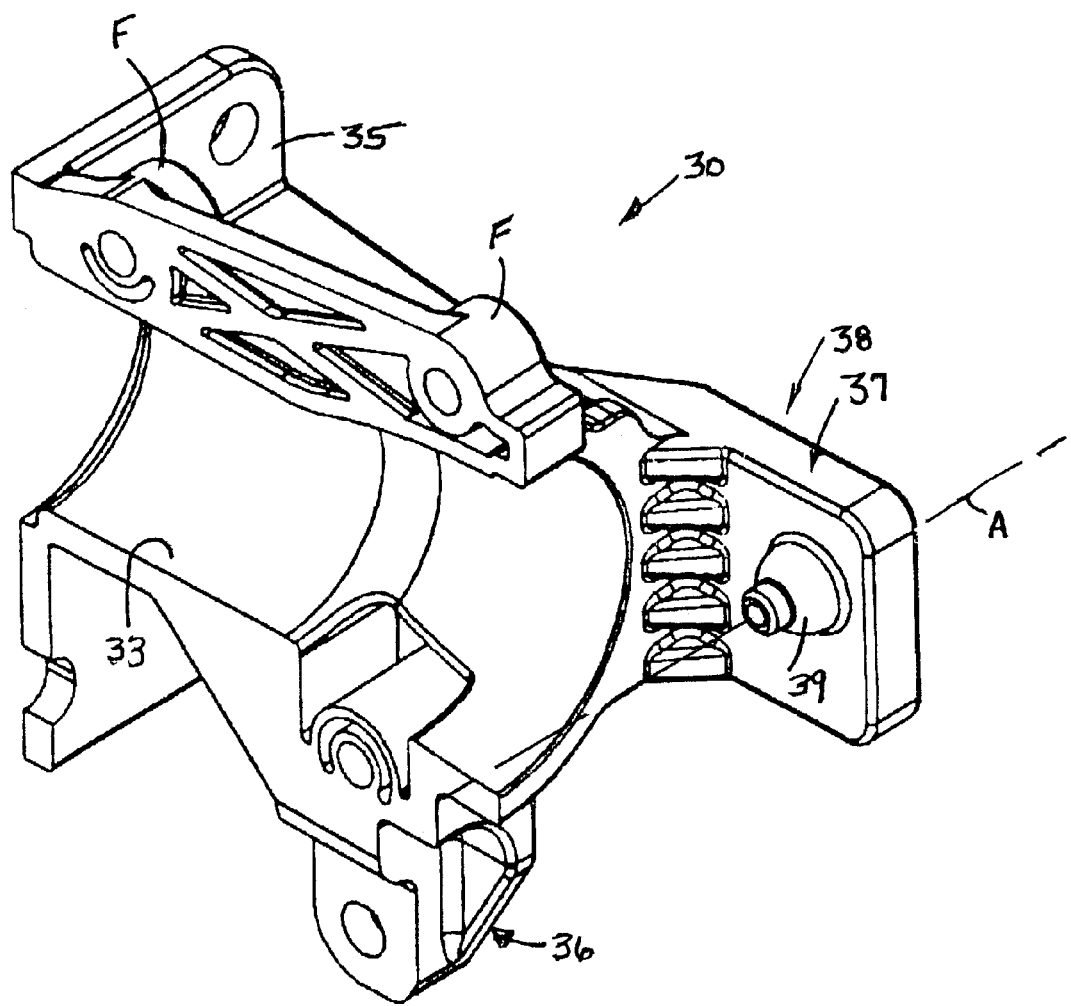
FIG. 5 is an oblique view of an inner face of one half of the lower composite steering column housing shown in FIG. 1.

Referring to FIGS. 1, 2, and 4, the lower housing assembly 18 is contemplated to be formed from two or more mold or casting halves. As best illustrated in FIG. 2, the line of bisection is illustrated by the line B which marks the interface between the right half 30 of the lower housing assembly 18 and the left half 32 of the lower housing assembly 18. In FIG. 2, the assembled lower housing assembly 18 includes a tubular longitudinal passage 33 through which the lower steering column shaft 14 extends. The two halves 30, 32 cooperate and define a flange 35 at the lower end of the housing assembly 16 for bolting the lower housing assembly 18 to the vehicle. At the opposite end of the lower housing assembly 18, one half of a bracket member 36 is formed on each component for reasons which will be readily apparent below. Moreover, each half 30, 32 of the lower housing assembly 18 further includes an extending flange 37 which cooperates to form a yoke 38 for affecting the pivotal coupling with the upper housing assembly 20. A hemispherical coupler 39 is illustrated which may extend from the inner surface of the flange 37 to form a ball-type coupling between the upper housing assembly 20 and the lower housing assembly 18 similar to that disclosed in U.S. Pat. No. 5,899,497 and assigned to Douglas Autotech Corporation. Moreover, each is coupled to the other along shared mating surfaces and held together by bolts or other fasteners passing through each half at predetermined boss locations such as identified by the letter F. This type of construction of the lower housing assembly 18 permits each half 30, 32 to be mold or cast, preferably injection molded from a high strength polymeric material such as glass-filled nylon or similarly strong polymeric material. In a preferred embodiment, the components are formed by injection molding using Verton RF-700-12 EM HS UV BK9-001 (60% Long Glass filled nylon). But just about any moldable material could also be used, depending upon the desired strength requirements. Die casting of the components from Magnesium, Aluminum, and other light weight metals have also been considered. The only molding issues encountered are the formation of weld lines (areas where the glass fibers don't fully mesh such as occurs around holes), and warpage of the ears on the lower housing. By creating the housing from injection molded polymeric materials, the overall structure is substantially lighter in weight than conventional steel structures. There is about a 25% weight reduction vs. a steel equivalent. The bolts or other fasteners extending between the two housing halves 30, 32 at the fixed locations F provide a rigid tubular support structure for the steering column assembly 10.

Figure 6:
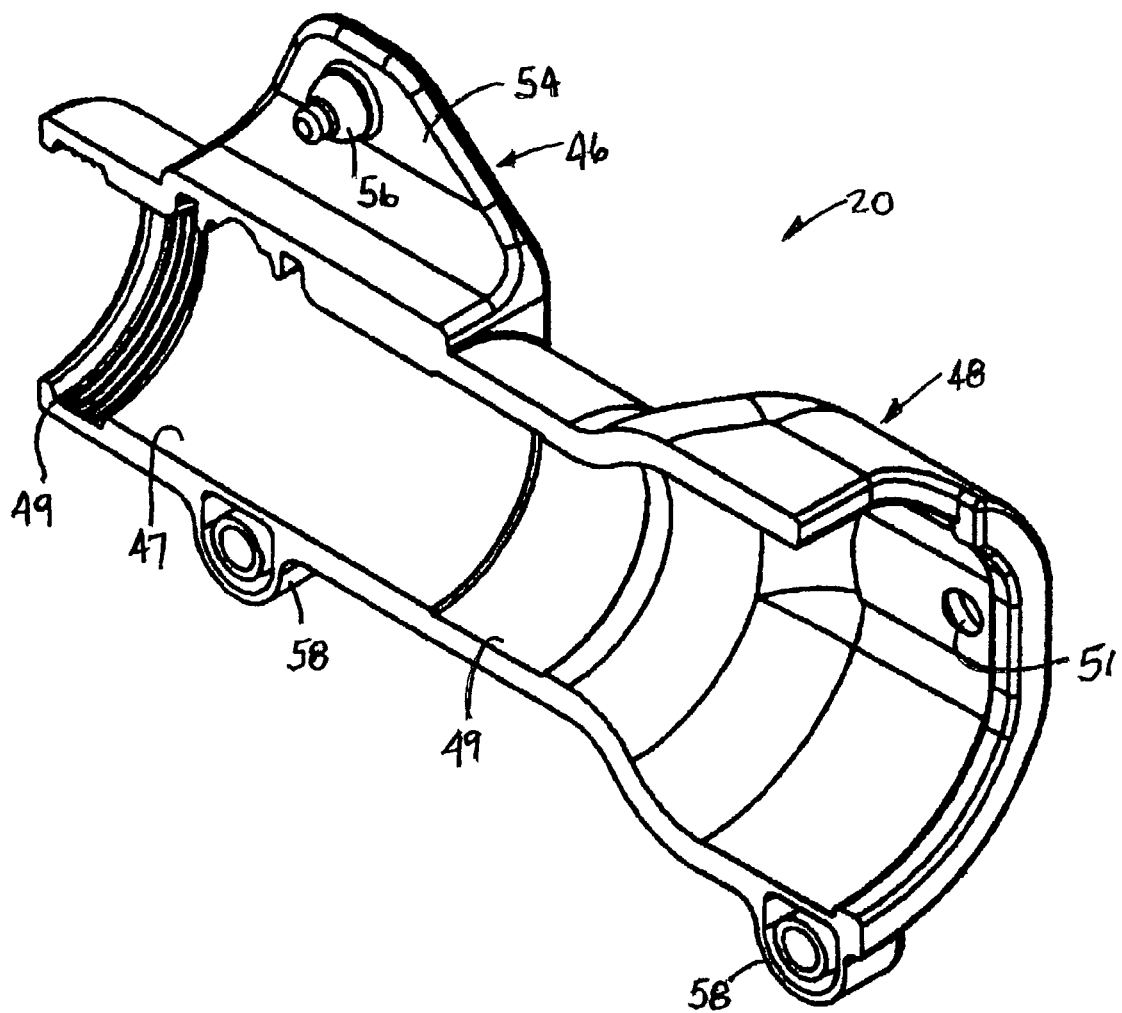
FIG. 6 is an oblique view of an inner face of one half of the upper portion of the composite steering column housing shown in FIG. 1.

A similar construction method is utilized to form the two halves 40, 42 of upper housing assembly 20. As shown in FIGS. 1, 3, and 6, the upper housing assembly 20 includes a right portion 40, and a left portion 42 interconnected similar to steering column assembly 10. When combined together, the two halves 40, 42, define a longitudinal passage 47 which is configured at two locations to form bearing seats such as 49 for mounting bearings 44 and 50 (See FIG. 4) at spaced locations to journal the upper steering column shaft 12. On the exterior of the upper housing assembly 20, the two halves 40, 42 combine to form a bracket member 46, briefly mentioned earlier, to support one end of the locking mechanism 22. The two halves 40, 42, are coupled along matching faces using appropriate fasteners such as the bolts mentioned earlier.

Referring to FIGS. 1 and 6, the upper housing assembly 20 is generally cylindrical, having an enlarged bell portion 48 which includes opposing and aligned recesses 51 for receiving the hemispherical couplers 39 described earlier extending from the inner surfaces of the flanges 37 forming the yoke 38. The interaction of the hemispherical couplers 39 with the recesses 51 in the bell portion 48 serve to define the pivot Axis A between the two members and about the universal joint 52 best shown in FIG. 4 interconnecting an upper end of shaft 14 with the lower end of shaft 12. Likewise, as with the lower housing assembly 18, the bracket member 46 defined proximate one end of the upper housing assembly 20 is formed by downwardly extending flange 54. The flanges 54 extending from each half 40, 42 of the upper housing assembly 20, cooperate to produce a yoke-like structure, for supporting one end of the position locking mechanism 22, as well as the release mechanism 24, The coupling between the position locking mechanism 22, release mechanism 24, and the bracket member 46, may be affected in a number of ways using a variety of fasteners, although it is contemplated to use the hemispherical couplers 56 similar to that defined on the flanges 37 with conventional screws or bolts passing concentrically through each of the two hemispherical couplers 56 to provide the proper load on the coupling, as well as to fasten the two housing halves 40, 42 together at that juncture. Likewise, other bosses F may be defined in each half 40,42 to receive other fasteners there through such as 58, to rigidly interconnect the two halves 40, 42, to form the upper housing assembly 20.

As mentioned above, it is contemplated in one aspect of the invention the two halves 40, 42 of the upper housing assembly 20 be formed from a polymeric material using injection molding or related techniques. In this manner, a substantial weight reduction can be achieved by using the polymeric or light weight metal materials, which can be structured to provide substantial rigidity and support to the upper steering column shaft 12. Moreover, the two halves 40, 42 provide assembling advantages over the prior art by providing direct access to the longitudinal passage 47 where bearings 44 and 50 can be inserted before being enclosed by the opposite half of the upper housing assembly 20.

Modifications of the invention described above will occur to those skilled in the art and to those who make or use the invention. For example, it is contemplated that fixed steering column housings may be formed from a polymeric material for use in harsh environments such as salt water. The polymeric material itself may be self lubricating so the steering column shafts rotate easily. Likewise, telescoping steering column designs may also be built using the polymeric material to form a shuttle or slide within either the upper or lower steering column housings. Again, the polymeric materials could be selected to provide the desired characteristics. Therefore, it is understood that the embodiments shown in these drawings and described herein are merely for illustrative purposes and not intended to limit the scope of the invention, which is defined by any claims in a subsequent or related application and interpreted according to the principals of patent law, including the doctrine of equivalence.

The invention claimed is:

1. A steering column assembly, comprising in combination:

a lower steering column housing formed from at least a first and a second mating member interconnected together transversely relative to a longitudinal passage extending between an upper and a lower end of said lower steering column housing, said longitudinal passage having at least one bearing seat formed therein;

an upper steering column housing formed from at least a first and a second mating member interconnected together transversely relative to form a longitudinal passage extending between an upper and a lower end of said upper steering column housing, said lower end of said longitudinal passage within said upper steering column housing having an inside diameter greater than an inside diameter of said upper end with said longitudinal passage having at least one bearing seat formed therein, said lower end of said upper steering column housing pivotally coupled to said upper end of said lower steering column housing such that said upper steering column housing pivots between a first and a second position relative to said lower steering column housing; and a positioning device interconnecting said upper steering column housing with said lower steering column housing to adjustably hold a pivot position of the upper steering column housing relative to the lower steering column housing.

2. The steering column assembly as defined in claim 1, further comprising at least one bearing member disposed within said at least one bearing seat formed within each of said lower and upper steering column housings.

3. The steering column assembly as defined in claim 1, further comprising:

a lower steering column shaft journaled within said lower steering column housing; and an upper steering column shaft journaled within said upper steering column housing and interconnected to said lower steering column shaft by a universal joint.

4. The steering column assembly as defined in claim 1, wherein said first and second mating members of said lower and upper steering column housing members are formed from a polymeric material.

5. The steering column assembly as defined in claim 1, wherein said first and second mating members of said lower and upper steering column housing members are injection molded from a polymeric material.

6. The steering column assembly as defined in claim 1, wherein said positioning device is selected from the group of pneumatic, hydraulic, tooth and pawl, and magneto-rheological locking members.

7. A tiltable steering-column housing for a motor vehicle, comprising in combination:

a lower member formed from at least two injection-molded halves coupled together along a longitudinal axis substantially parallel to a longitudinal passage interconnecting an upper end to a lower end of said lower member, said longitudinal passage of said lower member having at least one bearing seat farmed therein;

an upper member formed from at least two injection-molded halves coupled together along a longitudinal axis substantially parallel to a longitudinal passage interconnecting an upper end to a lower end of said upper member, said longitudinal passage of said upper member having at least one bearing seat formed therein, said lower end of said upper member pivotally interconnected to said upper end of said lower member such that said upper member pivots between a first and a second position relative to said lower member;

a journal bearing configured to be disposed within each of said at least one bearing seat formed in each of said lower and upper member;

a lower and an upper steering column shaft configured to be disposed within a respective one of said longitudinal passages defined in each of said lower and upper members, and journaled within each longitudinal passage by said journal bearing; and a universal coupler for interconnecting said lower and upper steering column shafts.

* * * * *